(No Model.)

D. J. OVERHOLTZER.
BALING PRESS FEEDER.

No. 516,727.  Patented Mar. 20, 1894.

Witnesses:

Inventor,
David J. Overholtzer
By Denny & Co.
Attys

UNITED STATES PATENT OFFICE.

DAVID J. OVERHOLTZER, OF SPADRA, CALIFORNIA.

BALING-PRESS FEEDER.

SPECIFICATION forming part of Letters Patent No. 516,727, dated March 20, 1894.

Application filed November 8, 1893. Serial No. 490,367. (No model.)

*To all whom it may concern:*

Be it known that I, DAVID J. OVERHOLTZER, a citizen of the United States, residing at Spadra, Los Angeles county, State of California, have invented an Improvement in Baling-Press Feeders; and I hereby declare the following to be a full, clear, and exact description of the same.

My invention relates to a feeder for baling presses.

It consists in certain details of construction which will be more fully explained by reference to the accompanying drawings in which—

Figure 1:
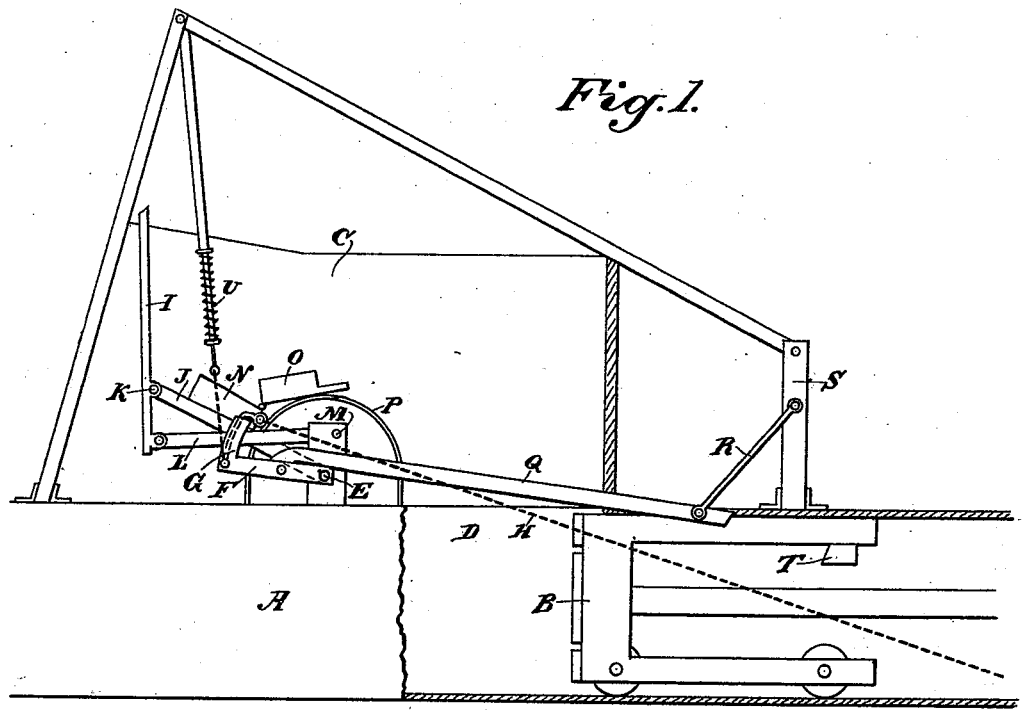
Figure 2:
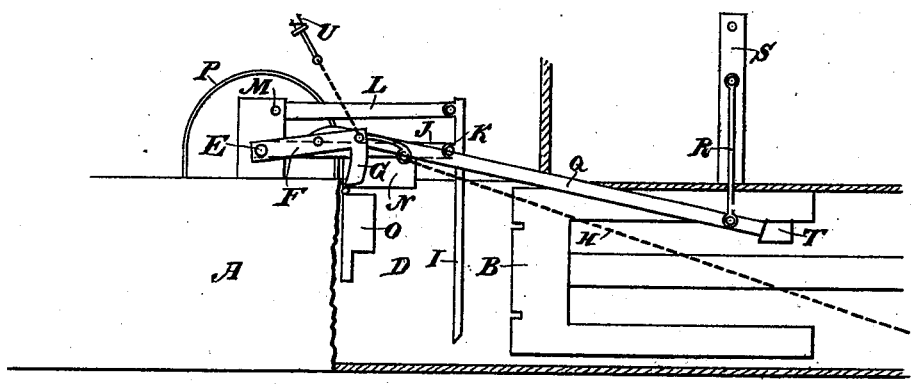

Figure 1 is a view showing the feeder opened. Fig. 2 shows it closed.

A is a horizontal baling press having a follower B adapted to reciprocate therein and compress the hay which is fed in front of it, into the opposite end of the press to form a bale.

C is a hopper situated above the press, into which the hay is placed in a loose condition, and D is the opening in the top of the press through which the hay is to be delivered into the body of the press in front of the follower.

My feeding apparatus is placed within the hopper, and operates as follows:—E is a shaft extending across the hopper, near the edge of the opening D. To this shaft, upon one end is fixed the crank arm F having connected with it a segment G to which the chain H is attached, and this chain connects with the power apparatus, not here shown, so that when the chain is pulled it will operate to rotate the crank F and the shaft E. I is a feed-board which forms the rear end or back of the feed hopper C. J J are arms connecting at one end with the shaft E, and at the other pivoted to the feed-board at points above its lower edge as shown at K. L L are two other arms pivoted at one end to the bottom of the feed-board, and at the other end to a stationary support at a point M above the line of the shaft E, and also a short distance on the opposite side from the feed-board I, of a vertical line through the shaft E. These two sets of arms J and L hold the feed-board in position and carry it around the mass of hay within the hopper, so that when the shaft E is rotated by action upon the crank arm F, this feed-board will carry the mass of hay which is in the hopper in front of it, down into the press in front of the follower, the feed-board being in the position shown in Fig. 2 after this operation is completed. N is a stout block secured to the arms J in front of the feed-board and this following around in a smaller curve than the outer edge of the feed-board presses the hay downward into the chamber of the baling press when the parts arrive in the position shown in Fig. 2. O is a block hinged to one of the inner angles of the block N, and when the feed-block is thrown back so that the hopper is in condition to receive the material to be pressed, this block O rests upon a metallic segment P having a radius of about eighteen inches about the central shaft E. When the hopper is full and the feed-board thrown forward to force the material into the chamber of the baling press, this block O moving over the curvature of the segment P, forces all that portion of the material which lies upon the segment, down into the chamber of the press, and when this is done, the parts occupy the position shown in Fig. 2. Q is an arm, one end of which is pivoted to the crank F. The opposite end is suspended by a swinging arm R, one end of which is fixed to a suitable supporting post as shown at S, and the other connected with the arm Q. T is a projecting block or lug upon the follower so placed that when the feeding device is moved to compress the material into the baling chamber, the end of the arm Q will have been moved approximately into contact with this block T, the swinging arm R allowing it to swing down sufficiently for that purpose. When the follower begins to move forward, the block T engaging the end of the arm Q, acts through it to push the crank arm F backward, thus rotating the shaft E and through it acting upon the arms L and N, the feed-board I and the other parts to carry them back to their first position, leaving the hopper open to receive another charge. U is a spring suspended above the hopper and flexibly connected with the end of the crank F, so that as the latter turns about the shaft E when the material is being forced into the baling chamber, this spring is compressed and exercises a certain amount of power to return the crank to its first position. It serves more particularly, however, to prevent the feeding apparatus striking too violently when it is moved into the pressing chamber if the latter is empty. By this construction I am enabled to both feed and condense the material into the baling chamber at a single operation.

Having thus described my invention, what I claim as new, and desire to secure by Letters Patent, is—

1. A baling press having a reciprocating follower, a hopper and an opening from the hopper into the chamber of the baling press in front of the follower, in combination with a feed mechanism consisting of a horizontal transverse shaft, a crank arm fixed to said shaft, a chain extending therefrom through which power is applied to rotate the shaft, a feed-board forming the rear of the hopper when it is thrown back into the open position, means pivotally connecting the lower end of the board to a fixed support in front thereof arms connecting the feed-board with the crank shaft whereby the feed-board is moved about the crank shaft to force the contents of the hopper into the press, substantially as herein described.

2. A feeding mechanism for a baling press consisting of a hopper with an opening through which material is delivered from the hopper into the chamber of the baling press, a shaft extending across the lower part of the hopper, a crank arm connected with said shaft, and chains connected with the crank arm through which power is applied to rotate the crank arm and shaft, a feed-board adapted to form the rear side of the hopper when opened, arms extending from the crank shaft to the feed-board and connecting therewith at points above the lower edge, other arms connecting with the lower edge having their opposite ends pivoted at points above and to one side of the central shaft E, and a transverse block N secured to the operating arms of the feed-board in front of the latter, substantially as herein described.

3. A feeding device for baling presses consisting of a hopper having an opening through which material is delivered from the hopper into the chamber of the press, a shaft extending transversely across the lower part of the hopper to one side of said opening, a crank arm and chains through which power is applied to rotate the shaft, a feed-board which forms the rear side of the hopper when opened, arms having one end connected with the lower edge of the feed-board and the opposite ends pivoted to a stationary support above and to one side of the driving shaft, and other arms connecting the feed-board with the shaft, a block extending across the second set of arms in front of the feed-board, a second block hinged to the front inner angle of said block, a cylindrical segment having the driving shaft as its center, over the surface of which the hinged block travels when the feed-board is operated to compress the material into the baling chamber, substantially as herein described.

4. A feeding device for baling presses consisting of a hopper having an opening through which material is delivered therefrom into the chamber of the baling press, a shaft journaled across the lower part of the hopper at one side of the feed opening, a crank arm and chains connected therewith by which power is applied to rotate the shaft, a segmental guide, a feed-board and feeding blocks connected with the shaft adapted to move therewith around the segment so as to force the contents of the hopper into the chamber of the press, an arm having one end connected with the crank arm of the feeder and the other end supported by a swinging arm by which it is allowed to descend when the feeder is operated, a block fixed upon the follower with which the end of said arm engages when the feeder has delivered its charge and the follower commences to move forward whereby the feeder is returned to its first position, substantially as herein described.

5. A feeder for baling presses consisting of a hopper, from which the material is delivered into the baling chamber, a horizontal shaft extending across the lower part of the hopper at one side of the feed opening, a crank arm and chains by which said shaft is rotated, a feed-board forming one side of the hopper when opened, arms connecting said feed-board with the crank shaft, and blocks acting in conjunction therewith to compress the material into the baling chamber when the feed-board is thrown forward, returning arms actuated by the follower when the latter moves to compress the charge, and suspending springs connected with the crank arms whereby the weight of the movable parts is counterbalanced, substantially as herein described.

In witness whereof I have hereunto set my hand.

DAVID J. OVERHOLTZER.

Witnesses:
A. H. TUFTS,
C. T. SMALL.